United States Patent [19]

Maylandt et al.

[11] 4,306,273

[45] Dec. 15, 1981

[54] CAPACITORS

[75] Inventors: Helmut Maylandt, Plochingen; Herbert Grossman, Affalterbach, both of Fed. Rep. of Germany

[73] Assignee: Robert Bosch GmbH, Stuttgart, Fed. Rep. of Germany

[21] Appl. No.: 109,830

[22] Filed: Jan. 7, 1980

Related U.S. Application Data

[63] Continuation of Ser. No. 920,720, Jun. 30, 1978, abandoned.

[30] Foreign Application Priority Data

Aug. 23, 1977 [DE] Fed. Rep. of Germany ....... 2737863

[51] Int. Cl.³ .............................................. H01G 4/22
[52] U.S. Cl. .................................... 361/318; 361/315; 361/319; 361/327
[58] Field of Search ............... 361/273, 312, 314, 315, 361/327, 318, 319

[56] References Cited

U.S. PATENT DOCUMENTS

| 1,576,096 | 3/1926 | Davey | 361/314 |
| 2,890,396 | 6/1959 | Hutzler | 361/315 |
| 3,724,043 | 4/1973 | Eustance | 361/314 X |
| 3,833,978 | 9/1974 | Eustance | 29/25.42 |
| 3,854,182 | 12/1974 | Forster | 361/314 X |
| 4,124,834 | 11/1978 | Walsh | 361/318 X |

FOREIGN PATENT DOCUMENTS

| 2500517 | 7/1975 | Fed. Rep. of Germany | 361/315 |
| 373011 | 5/1932 | United Kingdom | 361/315 |
| 529375 | 11/1940 | United Kingdom | 361/315 |
| 882815 | 11/1961 | United Kingdom | 361/273 |

*Primary Examiner*—Richard R. Kucia
*Attorney, Agent, or Firm*—Frishauf, Holtz, Goodman & Woodward

[57] ABSTRACT

Coiled or stacked capacitors preferably of the self-healing type which exhibit very low variation of capacitance over the service life. A capacitor winding is impregnated with an insulating impregnating material. The capacitor housing is then filled with an impregnating filling material which has a higher dielectric constant than the insulating impregnating material.

11 Claims, 5 Drawing Figures

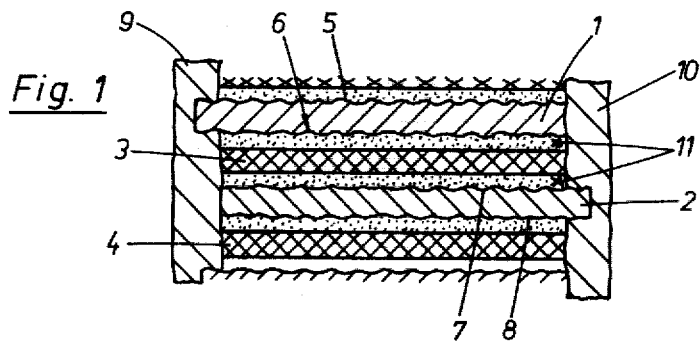
Fig. 1
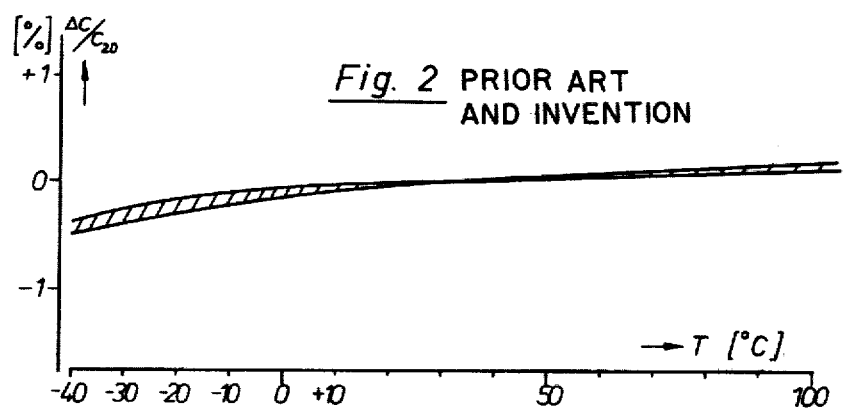
Fig. 2 PRIOR ART AND INVENTION

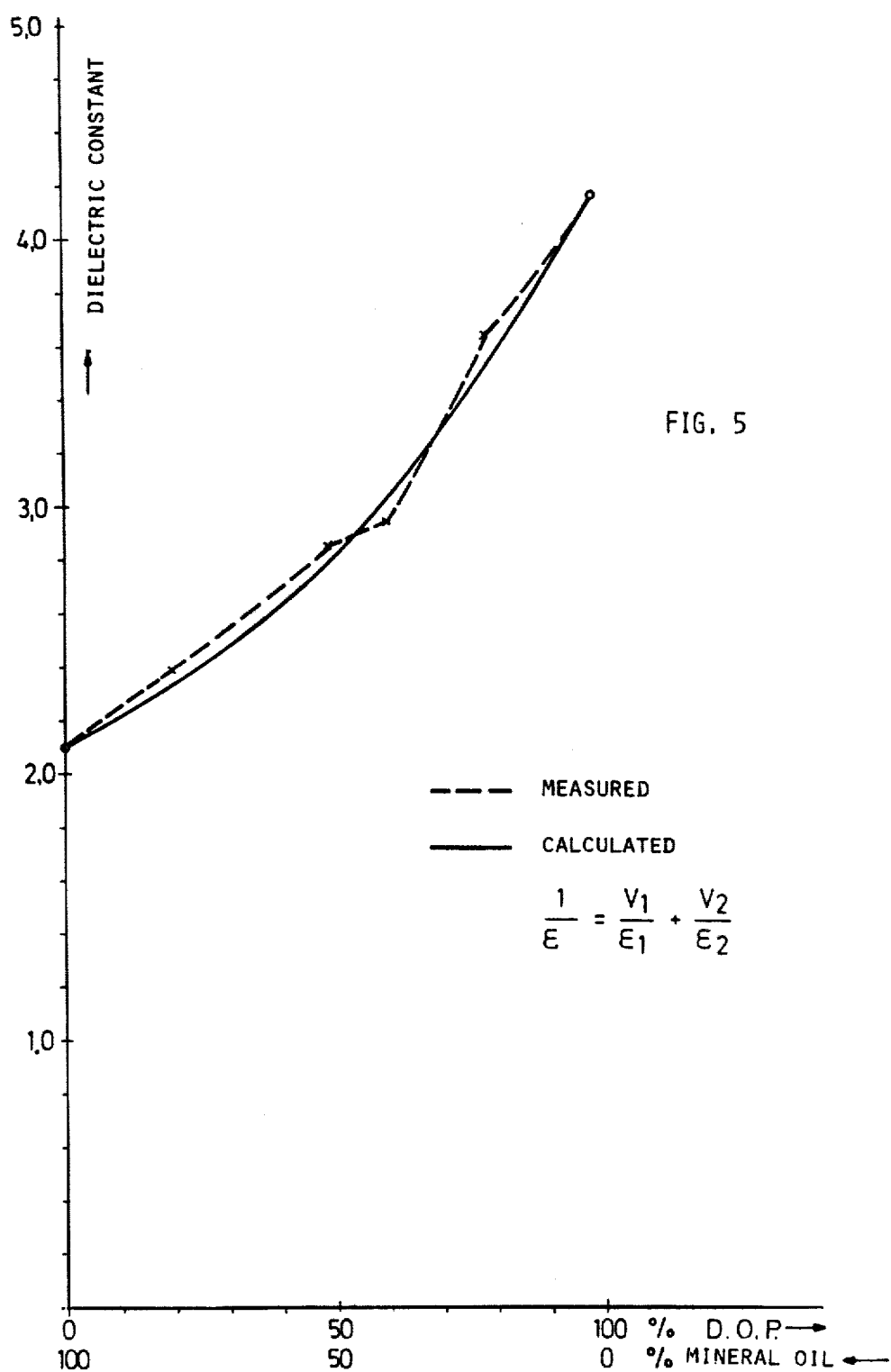

CAPACITORS

This is a continuation of application Ser. No. 920,720 filed June 30, 1978, now abandoned.

BACKGROUND OF THE INVENTION

The invention provides improved spiral (coiled) or layered capacitors. It is a requirement of various capacitors, for example, low-energy and high-frequency technology capacitors and also capacitors used with alternating current in power grids, that the possible variation in the capacitance should be controlled within a specified range to prevent damage to the capacitor itself and, also, to the installation which includes the capacitor. Aside from a somewhat larger tolerance in the nominal capacitance at start-up, the permitted tolerance (variation) of the capacitance during operation of the capacitor is generally only a few percent. Variation of the capacitance generally results from two different causes. The capacitance may change as a consequence of the change in temperature dependent upon the temperature coefficient of the dielectric contained in the capacitor. Such a capacitance variation is largely reversible. Capacitance also varies during the service life of the capacitor due to aging. This variation is largely irreversible.

The change in capacitance as a consequence of temperature changes can be controlled as is known by selection of the type and amount of solid and liquid insulating components of the capacitor, particularly selecting materials such that the temperature coefficient of the dielectric constant is positive with respect to paper and negative with respect to the liquid impregnating materials. It is also possible to compensate for the capacitance variation resulting from temperature changes by incorporating strips or ribbons of synthetic material in a capacitor to form a composite structure and using synthetics having a temperature coefficient of the dielectric constant which is opposite that of the paper.

Mineral oil is a well-known impregnating material used in capacitors. It is also known to use insulating liquids having a higher dielectric constant, such as dioctylphthalate (DOP) and dinonylphthalate (DNP) in place of mineral oil. The use of these higher dielectric constant impregnating materials is particularly suitable for capacitors having self-healing characteristics. The use of such an impregnating liquid having the higher dielectric constant results in capacitors having a high specific capacitance and high resistance to glow discharge. Tests of such capacitors carried out over lengthy service periods at high temperature and with a high potential, e.g., 100° C. and about 1.3 $U_N$ have produced results reporting that the change in capacitance during the test period was much greater than the variation in capacitance resulting from temperature change. As a consequence, the total change in capacitance during service may exceed the permissible tolerance set by the specifications for the capacitor.

Since such impregnated capacitors which were encapsulated in a housing which also contained a filling medium did not exhibit glow discharge nor decomposition of the impregnating material or of the metallic layers during the extended service test, a possible explanation for the lowering of the capacitance is that the influence of the electric field caused oscillation of the coatings resulting in a larger quantity of insulating material being expelled during the operating period than can be reabsorbed from the reverse flow of material. The interchange of the insulating material is impeded by the swelling of the foil winding which consists of the synthetic material. Oscillations of the coatings caused by pulsation of the electrostatic attractive forces of the alternating field are proportional to the square of the field strength. This explains why there is a small decrease in the capacitance when using dioctylphthalate as the impregnation material when compared with using mineral oil. The dielectric constant of dioctylphthalate is twice the value for mineral oil, resulting in a more advantageous field distribution and a reduced "pumping" action. Following this line of technology, it would be necessary to impregnate and fill a capacitor with a medium having a dielectric constant higher than that of dioctylphthalate in order to obtain a capacitor which exhibits a smaller decreased capacitance during service.

THE INVENTION

It is an object to provide capacitors having high specific capacitance, good resistance to glow discharge, and small variation of capacitance during service life without having to use an impregnating material which has the highest possible dielectric constant.

The capacitors are generally of a spiral or a layered structure and have self-healing characteristics. The metal foil layers are separated with layers of dielectric material, for example, paper or synthetic dielectric sheet material, or mixtures of paper and synthetic material. In accordance with the invention, capacitors further impregnated with a liquid insulating material which is liquid at operating temperature of the capacitor. The alternating layers of foil and dielectric are enclosed within the capacitor housing which is then filled with an insulating liquid which is liquid at capacitor operating temperature and which has a higher dielectric constant than the insulating liquid used to impregnate the dielectric layers. In accordance with a feature of the invention, the dielectric constant of the filling liquid has a numerical value at least about 0.5 larger than the numerical value of the dielectric constant of the impregnating liquid to obtain the full benefit of the present invention. The impregnating liquid used to impregnate the dielectric layers and the insulating liquid used to fill the capacitor should be miscible over the wide range of relative proportions which can occur as a result of admixing at the time the capacitor is filled and then during operation thereof.

The invention is further illustrated in the drawings and detailed description and Examples which follow:

FIG. 1 is a partial sectional view through a capacitor;

FIG. 2 is a graph showing the variation of capacitance with changes in temperature of prior art capacitors and capacitors of the present invention;

FIG. 5 is a graph reporting the dielectric constant of different mineral oil-dioctylphthalate mixtures.

Figure 3:
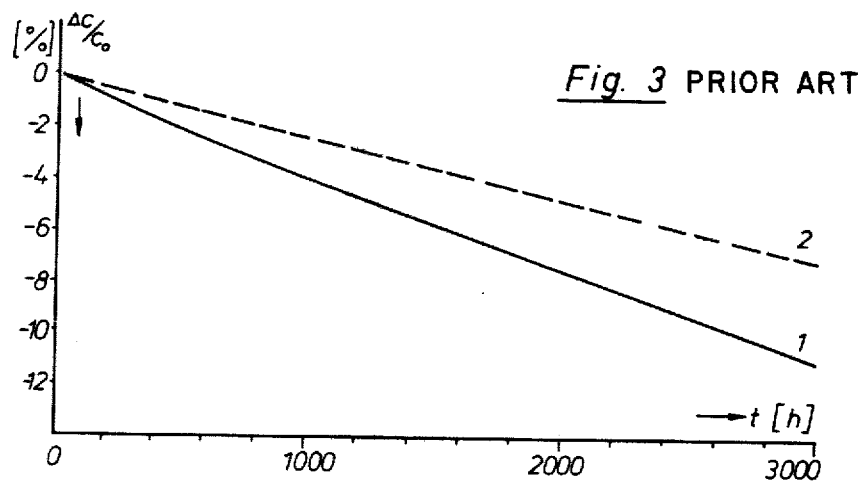
FIG. 3 is a graph showing variation in capacitance of prior art capacitors during extended service.

FIG. 1 illustrates a known capacitor which is designed by proper selection of materials to have a variation of capacitance with temperature variation within desired limits. Dielectric paper layer 1 is coated on both sides with a self-healing vacuum deposited metallic coating 5 and 6, respectively. Similar paper layer 2 is coated on both sides with corresponding respective metallic coatings 7 and 8. Coated layers 1 and 2 are separated by polycarbonate layers 3 and 4. The foil capacitor winding is contacted at its ends with bridging contacts 9 and 10 which are deposited by metal spraying. The capacitor winding assembly which has been described is impregnated with an impregnating liquid, e.g., mineral oil. When the winding assembly is enclosed in the metal capacitor enclosure, the enclosed space which contains the wound assembly is then filled with an impregnating medium and depending upon the design of the capacitor structure, the amount of impregnating medium may be sufficient to include an air cushion, or there may be insufficient space left for such an air cushion.

A self-healing capacitor, such as that illustrated in FIG. 1, is made by vapor depositing a metal, e.g., aluminum, in an evacuated vessel (less than $10^{-3}$ Torr) on a sheet or ribbon of dielectric material which because it is porous or because of its design can be impregnated with an insulating liquid. The metal thickness is less than 0.05 $\mu$m resulting in a coating having a resistance per square unit of area of about 2–6 ohms. The Al coated sheet is wound on a hollow cylinder to form a coil which is then cut into individual capacitor windings. The contact ends are zinc which has been sprayed onto the ends (exposed end cross-section) of the winding. The leads are usually soldered to the zinc ends. If Zn is used as the electrode material instead of Al, the unit resistance is preferably 1.5–5 ohms with a thickness of less than 0.07 $\mu$m.

FIG. 2 is a graph of the reported data showing variation in capacitance of such a mineral oil impregnated and filled capacitor with a temperature variation between $-40°$ C. and $100°$ C. The variation is less than about $\pm 0.5\%$, being so small that there is little requirement for further improvement.

FIG. 3 is a graph reporting the decrease in capacitance of two capacitors having the structure illustrated in FIG. 1 over a period of 3,000 hours of service. The solid line 1 shows the results for a capacitor having mineral oil as the impregnating liquid and fill. The broken line 2 shows the data for a similar capacitor, except that it is impregnated with dinonylphthalate instead of mineral oil. The reported data in FIG. 3 establishes that the decrease in capacitance over extended service may exceed the maximum 5% variation which is specified by standard specifications and in conjunction with the applied load. The difference between the curves 1 and 2 results from the fact that oscillation of the coatings caused by pulsation of electrostatic forces in the alternating field causes displacement of the impregnating liquid from the gaps between the coatings. As a consequence of the fact that dinonylphthalate has a higher dielectric constant than mineral oil, there is a smaller decrease in capacitance for the dinonylphthalate impregnated capacitor over extended service. Dinonylphthalate's dielectric constant of about 4.7 is about twice that of mineral oil (2.2), resulting in a more advantageous field distribution in the dielectric material and a smaller displacement of the impregnating medium from the void or gaps between the laminations during oscillation in an alternating field.

Figure 4:
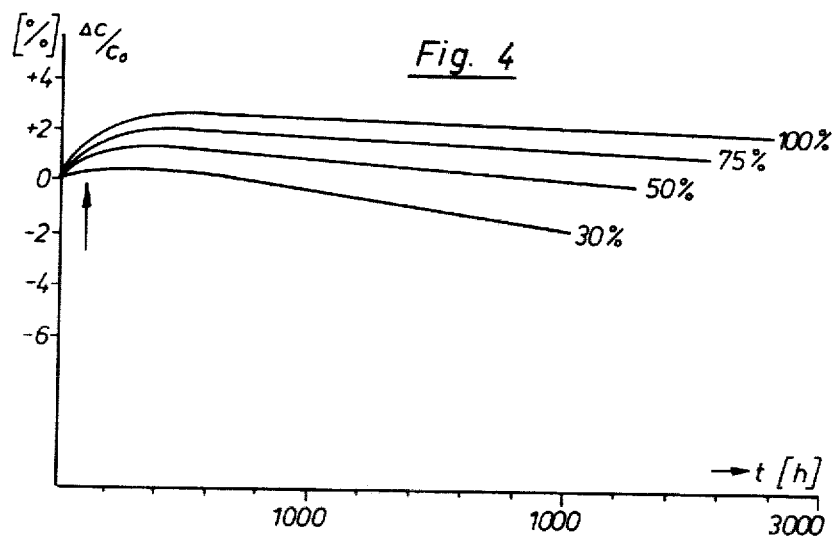
FIG. 4 is a graph showing variation in capacitance over extended service for exemplified capacitors of the present invention.

FIG. 4 shows the change in capacitance during extended time for four examples of capacitors of the present invention. The small variation in capacitance establishes the advantages of capacitors of the present invention. Capacitors as illustrated in FIG. 1 were prepared by first impregnating the assembly of alternating metallic layers and dielectric layers with mineral oil, placing the impregnated assembly in the capacitor housing and then filling the housing with a second impregnating liquid having a higher dielectric constant than the mineral oil. One capacitor was filled with a second impregnating liquid consisting of 100% of dinonylphthalate. A second capacitor was filled with an impregnating liquid consisting of a mixture of 75% dinonylphthalate and 25% mineral oil. A third capacitor was filled with a second impregnating liquid being a 50:50 mixture of the same two components. The fourth capacitor was filled with a second impregnating liquid consisting of a mixture of 30% dinonylphthalate and 70% mineral oil. These second impregnating liquids had respective dielectric constants of 4.5, 3.9, 3.3, and 2.8. All of these values are higher than the dielectric factor of 2.2 for mineral oil.

The four exemplified capacitors were tested at approximately $100°$ C. and approximately 30% above the usual power voltage. The capacitance initially increases slightly and then levels off, and eventually slightly decreases. The amount of decrease can be controlled by varying the relative proportions of the two impregnating liquids as is apparent from the results reported in FIG. 4. Thus, the change in capacitance when using a filling impregnated liquid consisting of 50:50 dinonylphthalate and mineral oil over a period of 3,000 hours is approximately $\pm 1\%$ of the starting value. This variation is far less than the variation for known standard capacitors as reported in FIG. 3.

The superior results reported by FIG. 4 may be explained by the fact that in the capacitors of the present invention, the amount of impregnating material expelled from the wound or layered assembly during the operating period is larger than the quantity of impregnating liquid which can be reabsorbed. However, because of the higher dielectric constant of the reabsorbed liquid, the loss in capacitance is minimized and is less than would occur if the excess impregnating liquid in the capacitor enclosure did not have the higher dielectric constant (DC) which characterizes the capacitors of the present invention.

Other combinations of impregnating liquid (lower DC) and filling liquid (higher DC) are shown in the following Table. The second column lists materials which are suitable as impregnating liquids and/or filling liquids with progressively increasing dielectric constant (Nos. 1–8). In the left portion of vertical column A, one impregnating liquid is noted (i.e., mineral oil). In the right-hand portion of column A, the various materials which are suitable as filling liquids to be used in combination with mineral oil as the impregnating liquid are specified (i.e., Nos. 3–11). Vertical column B reports the same information when using polyisobutylene as the impregnating liquid. Vertical column C provides the same information when using silicone oil as the impregnating liquid. Vertical column D gives similar data, except that it is applicable to determine filling liquids which may be used with dinonylphthalate or dioctylphthalate. Vertical column E gives similar data when using castor oil as the impregnating liquid, and vertical column G gives similar data when using the partially chlorinated alkyldiphenyl oxide as the impregnating liquid. Mixtures 1–7 which are reported in horizontal columns 9, 10, and 11 are materials prepared from 1 or more of the materials in horizontal columns 1–3, in admixture with one or more of the materials in horizontal columns 4–8. Mixture No. 9 has the dielectric constant of 2.7, mixture No. 10 of 3.2, and mixture No. 11 of 5.2. The various possible combinations which are readily apparent from the following Table may be used in capacitors of the present invention, such as that exemplified in FIG. 1, to obtain the improved results which characterize the capacitors of the present invention.

materials. Capacitors of the present invention should not utilize capacitor windings or capacitor stacks comprising metallized sheets of non-porous synthetic sheet material unless suitable means have been taken to ensure that they can be impregnated with the insulating liquid.

The impregnating liquid(s) and filling liquid(s) used are those that are miscible over the range of mixtures

TABLE

| | | | I = Impregnating Liquid | | | | | | F = Filling Liquid | | | |
|---|---|---|---|---|---|---|---|---|---|---|---|---|
| | | | A | | B | | C | | D | | E | | G |
| No. | | D.C. | I | F | I | F | I | F | I | F | I | F | I | F |
| 1 | MINERAL OIL | 2.2 | X | — | — | — | — | — | — | — | — | — | — | — |
| 2 | POLYISOBUTYLENE | 2.2 | — | X | — | — | — | — | — | — | — | — | — | — |
| 3 | SILICONE OIL | ~2.7 | X | — | X | — | X | — | — | — | — | — | — | — |
| 4 | DINONYLPHTHALATE | ~4.5 | X | — | X | — | X | X | — | — | — | — | — | — |
| 5 | CASTOR OIL | ~1.6 | X | — | X | — | X | — | — | X | — | — | — | — |
| 6 | DICOTYLPHTHALATE | ~4.7 | X | — | X | — | X | X | — | — | — | — | — | — |
| 7 | PARTIALLY CHLORINATED ALKYLDIPHENYLOXIDE | ~4.7 | X | — | X | — | X | — | — | — | X | — | — | — |
| 8 | ARYL-SULFONATE | 6 | X | — | X | — | X | — | X | — | X | — | X | — |
| 9 | MIXTURE 1-7 | 2.7 | X | — | X | — | — | — | — | — | — | — | — | — |
| 10 | MIXTURE 1-7 | 3.2 | X | — | X | — | X | — | — | — | — | — | — | — |
| 11 | MIXTURE 1-7 | 5.2 | X | — | X | — | X | — | X | — | X | — | X | — |

Although the capacitors of the present invention are first impregnated with an impregnating liquid having a lower dielectric constant, their resistance to glow discharge is similar to that of a capacitor impregnated with a material having a higher dielectric factor. This is explained by the fact that glow discharges occur primarily at the edges of the layers which are the places of highest field strength and only a short distance from the ends of the assembly forming the coiled or stacked winding. In the capacitors of the present invention, these places wherein the glow discharge primarily occurs are the places where the filler liquid having the higher dielectric constant penetrates during the first few service hours when the capacitors are in use, resulting in a reduction in the field strength in the liquid region at the boundary of the dielectric material. The curves of FIG. 4 are shown to vary dependent upon the dielectric constant of the filling liquid since, in each case, the impregnating liquid was the same (i.e., mineral oil). The said curves of capacitance during service life also are a function of the type of paper layer and of the synthetic layers utilized in the construction of the capacitor. The characteristics of such materials which influence the results particularly include the surface roughness of the layers, the amount of swelling when impregnated, and the density of the material, e.g., paper. The variation of the capacitance over the service life is also influenced by the amount of compression of the layers in the coiled or layered (stacked) assembly of the capacitor. By taking such design factors into consideration, capacitors can be designed having desired variation of capacitance over service life merely by carrying out such analysis and, possibly, simple tests.

The capacitors within the scope of the present invention not only include those having the structure and dielectric materials illustrated in FIG. 1, but also may be constructed of all known and possible combinations of paper dielectrics alone, and paper in combination with porous synthetic materials which may be impregnated, even non-porous synthetic sheet material which has been constructed so that the impregnating fluid can penetrate through the dielectric sheet component of the winding. This may be accomplished by embossing the sheet, intertwining or weaving to form the sheet, etc. Polypropylene and polycarbonate are useful synthetic which may be formed in the capacitor vessel. This can be determined by test for each contemplated combination. A suitable test involves determining the capacitance of the empty capacitor ($C_1$), and the capacitor filled with different samples (different proportions) of the impregnating and filling liquids ($C_2$). The dielectric constant is $\epsilon = C_2/C_1$. With the vertical axis as the increasing $\epsilon$ dielectric contact values and the horizontal axis as the relative proportions of the impregnating liquid and the filling liquid, the values of $\epsilon$ for different mixtures are plotted. The useful combinations are those wherein the values form an upward continuous curve without reversal of slope throughout the area covering proportions of the fluids which could be formed in the capacitor. A curve may also be plotted from the known formulas applying to mixtures, e.g., according to $1/\epsilon = V_1/\epsilon_1 = V_2/\epsilon_2$ wherein $V_1$ and $V_2$ represent the corresponding portion of the volumes. The curve plotted from these values is plotted as the solid curve FIG. 5. The curve obtained by joining experimentally determined points for the dielectric constant of various mineral oil-dictylphthalate mixtures is plotted as the dashed line on FIG. 5. These two curves substantially correspond with each other.

The advantageous effect of the combination of the impregnating liquid and the filling liquid having a higher dielectric constant is useful not only for the exemplified self-healing (or curing) capacitors illustrated in FIG. 1, but also applicable to such impregnated capacitors utilizing metal foil laminates because the edges of such capacitors are particularly susceptible to glow discharge at the edges of the layers resulting from expansion of the liquid film. The self-healing capacitors of the present invention utilize liquids such that when decomposition of the insulating media occurs during the self-healing blowout, such decomposition products are nonconductive. Self-healing capacitors have been well-known since almost 1940. Many patent publications disclose self-healing capacitors, including German AS No. 1,564,792; OS No. 1,764,704; and OS No. 1,815,478.

We claim:

1. Multi-layer capacitor comprising a capacitor housing;

alternating layers of metal electrodes and impregnated dielectric sheet material located in the capacitor housing and occupying a portion of the space therein;

an insulating impregnating liquid impregnating said layers;

an insulating filling liquid in the remaining portion of the space in said housing, and at least partially filling the same, both the impregnating liquid and said filling liquid being liquid at the service temperature of the capacitor and being miscible over the range of mixtures which may be formed in the capacitor, in operation, the filling liquid having a dielectric constant of a numerical value which is at least about 0.5 larger than the numerical value of the dielectric constant of said impregnating liquid;

wherein said impregnating liquid comprises mineral oil;

and said filling liquid comprises at least one liquid selected from the group consisting of silicone oil, dinonylphthalate, castor oil, dioctylphthalate, partially chlorinated alkyldiphenyloxide, aryl-sulfonate, and a mixture having a pH of above about 2.7 of (i) at least one of: mineral oil, polyisobutylene, silicone oil, with (ii) one or more of: dinonylphthalate, castor oil, dioctylphthalate, partially chlorinated alkyldiphenyloxide, aryl-sulfonate.

2. Multi-layer capacitor comprising a capacitor housing;

alternating layers of metal electrodes and impregnated dielectric sheet material located in the capacitor housing and occupying a portion of the space therein;

an insulating impregnating liquid impregnating said layers;

an insulating filling liquid in the remaining portion of the space in said housing, and at least partially filling the same, both the impregnating liquid and said filling liquid being liquid at the service temperature of the capacitor and being miscible over the range of mixtures which may be formed in the capacitor, in operation, the filling liquid having a dielectric constant of a numerical value which is at least about 0.5 larger than the numerical value of the dielectric constant of said impregnating liquid;

wherein said impregnating liquid comprises at least one material selected from the group consisting of mineral oil and polyisobutylene;

and said filling liquid comprises at least one liquid selected from the group consisting of silicone oil, dinonylphthalate, castor oil, dioctylphthalate, partially chlorinated alkyldiphenyloxide, aryl-sulfonate, and a mixture of (i) at least one of: mineral oil, polyisobutylene, silicone oil with (ii) one or more of: dinonylphthalate, castor oil, dioctylphthalate, partially chlorinated alkyldiphenyloxide, aryl-sulfonate;

said mixture having a dielectric constant over 2.7.

3. Multi-layer capacitor comprising a capacitor housing;

alternating layers of metal electrodes and impregnated dielectric sheet material located in the capacitor housing and occupying a portion of the space therein;

an insulating impregnating liquid impregnating said layers;

an insulating filling liquid in the remaining portion of the space in said housing, and at least partially filling the same, both the impregnating liquid and said filling liquid being liquid at the service temperature of the capacitor and being miscible over the range of mixtures which may be formed in the capacitor, in operation, the filling liquid having a dielectric constant of a numerical value which is at least about 0.5 larger than the numerical value of the dielectric constant of said impregnating liquid;

wherein said impregnating liquid comprises silicone oil;

and said filling liquid comprises at least one liquid selected from the group consisting of dinonylphthalate, castor oil, dioctylphthalate, partially chlorinated alkyldiphenyloxide, aryl-sulfonate, and a mixture of (i) at least one of: mineral oil, polyisobutylene, silicone oil with (ii) one or more of: dinonylphthalate, castor oil, dioctylphthalate, partially chlorinated alkyldiphenyloxide, aryl-sulfonate;

said mixture having a dielectric constant over 3.2.

4. Multi-layer capacitor comprising a capacitor housing;

alternating layers of metal electrodes and impregnated dielectric sheet material located in the capacitor housing and occupying a portion of the space therein;

an insulating impregnating liquid impregnating said layers;

an insulating filling liquid in the remaining portion of the space in said housing, and at least partially filling the same, both the impregnating liquid and said filling liquid being liquid at the service temperature of the capacitor and being miscible over the range of mixtures which may be formed in the capacitor, in operation, the filling liquid having a dielectric constant of a numerical value which is at least about 0.5 larger than the numerical value of the dielectric constant of said impregnating liquid;

wherein said impregnating liquid comprises polyisobutylene;

and said filling liquid comprises at least one liquid selected from the group consisting of silicone oil, dinonylphthalate, castor oil, dioctylphthalate, partially chlorinated alkyldiphenyloxide, aryl-sulfonate, and a mixture of (i) at least one of: mineral oil, polyisobutylene, silicone oil with (ii) one or more of: dinonylphthalate, castor oil, dioctylphthalate, partially chlorinated alkyldiphenyloxide, aryl-sulfonate;

said mixture having a dielectric constant over 2.7.

5. Multi-layer capacitor comprising a capacitor housing;

alternating layers of metal electrodes and impregnated dielectric sheet material located in the capacitor housing and occupying a portion of the space therein;

an insulating impregnating liquid impregnating said layers;

an insulating filling liquid in the remaining portion of the space in said housing, and at least partially filling the same, both the impregnating liquid and said filling liquid being liquid at the service temperature of the capacitor and being miscible over the range of mixtures which may be formed in the capacitor, in operation, the filling liquid having a dielectric constant of a numerical value which is at least about 0.5 larger than the numerical value of the dielectric constant of said impregnating liquid;

wherein said impregnating liquid comprises silicone oil;

and said filling liquid comprises at least one liquid selected from the group consisting of dinonylphthalate, castor oil, dioctylphthalate, partially chlorinated alkyldiphenyloxide, aryl-sulfonate, and a mixture of (i) at least one of: mineral oil, polyisobutylene, silicone oil with (ii) one or more of: dinonylphthalate, castor oil, dioctylphthalate, partially chlorinated alkyldiphenyloxide, aryl-sulfonate;

said mixture having a dielectric constant over 3.2.

6. Multi-layer capacitor comprising a capacitor housing;

alternating layers of metal electrodes and impregnated dielectric sheet material located in the capacitor housing and occupying a portion of the space therein;

an insulating impregnating liquid impregnating said layers;

an insulating filling liquid in the remaining portion of the space in said housing, and at least partially filling the same, both the impregnating liquid and said filling liquid being liquid at the service temperature of the capacitor and being miscible over the range of mixtures which may be formed in the capacitor, in operation, the filling liquid having a dielectric constant of a numerical value which is at least about 0.5 larger than the numerical value of the dielectric constant of said impregnating layers;

wherein said impregnating liquid comprises at least one of: dinonylphthalate, dioctylphthalate;

and said filling liquid comprises at least one liquid selected from the group consisting of aryl-sulfonate, and a mixture of (i) at least one of: mineral oil, polyisobutylene, silicone oil with (ii) one or more of: castor oil, partially chlorinated alkyldiphenyloxide, aryl-sulfonate;

said mixture having a dielectric constant over 5.2.

7. Multi-layer capacitor comprising a capacitor housing;

alternating layers of metal electrodes and impregnated dielectric sheet material located in the capacitor housing and occupying a portion of the space therein;

an insulating impregnating liquid impregnating said layers;

an insulating filling liquid in the remaining portion of the space in said housing, and at least partially filling the same, both the impregnating liquid and said filling liquid being liquid at the service temperature of the capacitor and being miscible over the range of mixtures which may be formed in the capacitor, in operation, the filling liquid having a dielectric constant of a numerical value which is at least about 0.5 larger than the numerical value of the dielectric constant of said impregnating liquid;

wherein said impregnating liquid comprises castor oil;

and said filling liquid comprises at least one liquid selected from the group consisting of aryl-sulfonate, and a mixture of (i) at least one of: mineral oil, polyisobutylene, silicone oil, dinonylphthalate, castor oil, dioctylphthalate, partially chlorinated alkyldiphenyloxide, with (ii) aryl-sulfonate;

said mixture having a dielectric constant over 5.2.

8. Multi-layer capacitor comprising a capacitor housing;

alternating layers of metal electrodes and impregnated dielectric sheet material located in the capacitor housing and occupying a portion of the space therein;

an insulating impregnating liquid impregnating said layers;

an insulating filling liquid in the remaining portion of the space in said housing, and at least partially filling the same, both the impregnating liquid and said filling liquid being liquid at the service temperature of the capacitor and being miscible over the range of mixtures which may be formed in the capacitor, in operation, the filling liquid having a dielectric constant of a numerical value which is at least about 0.5 larger than the numerical value of the dielectric constant of said impregnating liquid;

wherein said impregnating liquid comprises partially chlorinated alkyldiphenyloxide;

and said filling liquid comprises at least one liquid selected from the group consisting of aryl-sulfonate, and a mixture of (i) at least one of: mineral oil, polyisobutylene, silicone oil, dinonylphthalate, castor oil, dioctylphthalate, partially chlorinated alkyldiphenyloxide, with (ii) aryl-sulfonate;

said mixture having a dielectric constant over 5.2.

9. A multi-layer capacitor comprising a capacitor housing;

alternating layers of metal electrodes and dielectric sheet material located in the capacitor housing and occupying a portion of the space therein;

an insulating impregnating liquid impregnating said layers;

an insulating filling liquid in the remaining portion of the space in said housing at least partially filling the same, both the impregnating liquid and said filling liquid being liquid at the service temperature of the capacitor and being miscible over the range of mixtures which may be formed in the capacitor, in operation;

wherein, in accordance with the invention, said insulating impregnating liquid for said layer and said insulating filling liquid filling the remaining portion of the space in said housing are characterized by having dielectric constants of such value that the dielectric constant of the filling liquid has a numerical value which is at least about 0.5 larger than the numerical value of the dielectric constant of the impregnating liquid of said layers.

10. The capacitor of claim 9, wherein said impregnating dielectric sheet material comprises at least one of the materials of the group consisting of impregnated paper sheet; impregnated plastic sheet; and sheet formed from mixtures of paper and plastic.

11. The capacitor of claim 9, wherein said alternating layers of metal electrodes and impregnated dielectric sheet material are formed of multiple layers of vapor-deposited aluminum, and the dielectric sheet material comprises at least one material of the group consisting of paper and plastic.

* * * * *